ADJUSTABLE MOUNTINGS FOR MAGNETIC HEADS AND THE LIKE

Original Filed April 2, 1956

INVENTOR
CHESTER E. BEACHELL
by R. J. Filipkowski
AGENT

United States Patent Office 2,997,547

Patented Aug. 22, 1961

2,997,547

ADJUSTABLE MOUNTINGS FOR MAGNETIC HEADS AND THE LIKE

Chester E. Beachell, Beaconsfield West, Quebec, Canada, assignor to Canadian Patents and Development Limited, Ottawa, Ontario, Canada Original application Apr. 2, 1956, Ser. No. 575,518. Divided and this application May 15, 1958, Ser. No. 735,545

7 Claims. (Cl. 179—100.2)

This invention relates to magnetic recording and reproducing systems, and is particularly concerned with adjustable mountings for positioning transducers in the magnetic recording and reproducing of sound from tape.

The present application is a division of my application Serial Number 575,518 filed Apr. 2, 1956, for "Sound Recording and Reproducing Apparatus Utilizing Perforated Magnetic Tape." The above identified application discloses film handling and transport mechanism arranged to stabilize to a very high order of precision the velocity and tension of a tensioned, fixed loop of narrow thin limp magnetic tape, having a polyester base such as that sold under the tradename "Mylar" and having a magnetic coating applied to its surface. This invention has as its purpose the provision of a mounting for the support of a magnetic transducer whereby the gap between the pole tips may be aligned in a desired position with respect to a reference position. More specifically, the invention seeks to provide a receptacle for supporting a magnetic recording or replay head in a predetermined, adjustable relationship to a reference frame, whereby to orient a gap in a magnetic sensing circuit in the head with respect to a lay of magnetic tape in contact with the gap.

It is well understood that for proper transducing action, particularly at the highest frequencies in the audible spectrum, the direction of motion of the tape engaging a transducer is required to be at right angles to the direction of the gap, and that the engagement should consist in substantially uniform sliding contact of the prepared side of the tape across the gap which spans the width of the track. In practice it has been found extremely difficult to establish and maintain for long periods a precise adjustment of all parameters involved in optimum orientation of the gap relative to the track along the tape. As those familiar with the art will readily understand, it has not heretofore been possible with the devices of the prior art to attain these joint objectives. Applicant has determined by extensive trial and experimentation that for complete adjustment of all parameters (azimuth, twist, tangency), a transducer-mounting device requires to be adjustable separately for rotation of the gap about each of three axes at right angles to each other. Applicant has further established that a narrow limp tape of the character described should engage a gap with constant tension and should wipe the gap with a deflection of the lay of about 6° of angle relative to the tangent line across the gap. It is to be understood that reference throughout the present discussion and in this specification is made to longitudinal magnetic recording, as by means of a slotted magnetically permeable body wherein a magnetic field is set up corresponding in some manner to a signal which is impressed or is to be impressed on the record medium, the direction of flux lines bridging the slot or gap being in the direction of motion or advance of the record medium.

Accordingly it is a principal object of the invention to provide a supporting housing for a magnetic transducer of the character referred to, adapted to be supported of a plate member and adjustable with respect thereto.

Another object of the invention is the provision of a receptacle open at one side adapted to retain a head therein rotatably adjustable about a first axis in the receptacle, and screw adjustment devices engaging a support frame and the receptacle to adjustably rock the head about a further pair of axes.

The above and yet other features of the invention will be made apparent from a reading of the following description of embodiments in which the invention may be realized, with reference to the accompanying figures of drawing, wherein.

Figures 1, 2, 3, 4:
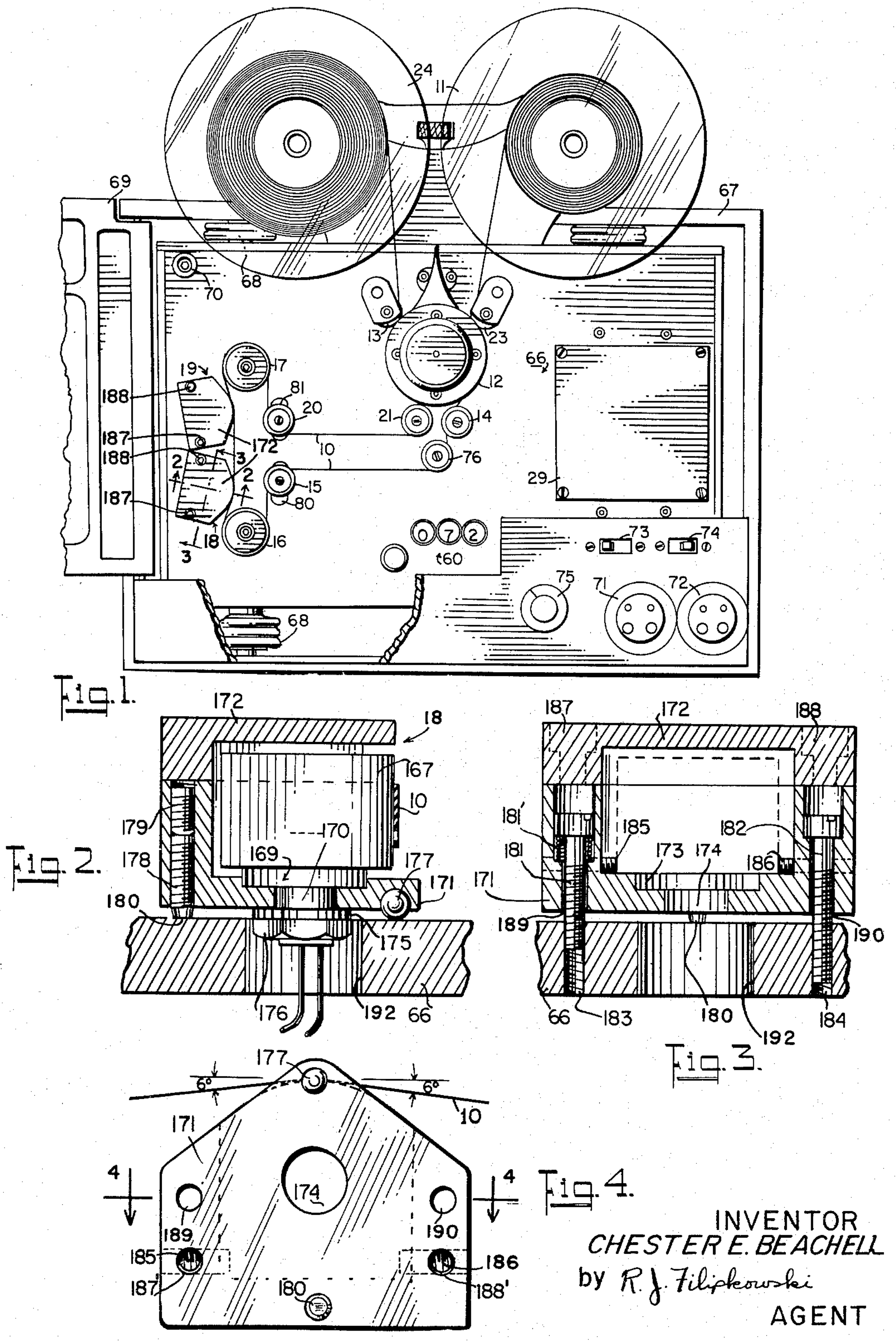
FIG. 1 is a front elevation view of a tape handling apparatus including magnetic transducer supports according to the invention.
FIG. 2 is a side elevation view in section taken on line 2—2 of FIG. 1, showing a receptacle adjustably supporting a magnetic head and means for rocking the receptacle with respect to a supporting plate member about a first axis.
FIG. 3 is a front elevation view in section through the receptacle of FIG. 1, taken on the line 3—3 in a plane at right angles to the line 2—2, and showing the adjusting means for effecting a rocking of the receptacle about a second axis; and, FIG. 4 is a bottom plan view of a receptacle showing the lay of tape with respect to the head, and the layout of screw holes and support areas.

Referring to FIG. 1 a form of recording and reproducing apparatus with which the invention may be employed comprises a transportable self-contained magnetic tape handling unit generally comprising an outer housing 67 in which a panel 66 is supported as by anti-shock suspension elements 68. A pair of tape storage reels 11 and 24 are suitably carried upon means fixed to the panel, for feeding a lay of tape 10 into and from a velocity-stabilized tight loop lay-transport mechanism, as more fully described in my aforesaid copending application Serial No. 575,518. The tape feeding and guiding mechanism forms no part of the present invention, and will briefly be described herein as comprising a panel-mounted group of lay-engaging idler rollers 14, 21, and 76, associated with a sprocketed reversible drive drum 12, a pair of frictionally lay-driven pulleys 16 and 17 engaging flywheel masses (not shown), and movable damping idlers 15 and 20, so arranged as to stabilize the velocity of the moving lay. More specifically, that portion of the loop passing between pulleys 16 and 17 and moving substantially parallel with the plane of the surface of panel 66, is stabilized in velocity for the purpose of receiving and recording or reproducing a high quality audio signal impressed on or transcribed from the tape by head assemblies 18, 19.

The tensioned lay of tape 10 is subjected to a constant deflection out of a path in which it would otherwise move between the faces of pulleys 16, 17, by virtue of the relative positions of the magnetic heads 18, 19 which are adjustably disposed on panels 66, so that the prepared face of the tape 10 wipes across the pole faces of respective transducers with a small included angle. In order that the pattern of variably energized transverse bands forming the sound track recorded on the tape medium may be correlated in proper transducing relation with the direction and attitude of the gap formed in a transducing head, means are provided for adjusting the latter to orient the gap in a desired orientation. The orienting means which will be elaborated hereinafter essentially comprise a mounting receptacle adapted to be secured on the face of a panel in a predetermined position, associated with clamp devices for releasably constraining a magnetic transducer therein to have three degrees of rotational freedom for limited rotation of the head gap about substantially orthogonally related adjustment axes. These axes may respectively be defined as a first axis generally perpendicular to the plane of the support panel for adjustment of tangency of the pole tips with respect to the lay; a second axis lying generally parallel with the plane of the support panel and parallel with the direction of lines of magnetic flux bridging the head gap to correct for twist of the lay out of a plane normal to the panel; and a third axis generally parallel with the plane of the support panel and perpendicular to the direction of lines of magnetic flux bridging the gap, for adjustment of azimuth of the gap with respect to the transverse dimension of the lay.

In a practical example of a completely orientable mounting for a magnetic transducer, it is contemplated to use a head such as one of those commercially manufactured by the Brush Development Company under the designations BK 1090 to BK 1092 inclusive, or BK 1200 to BK 1202 inclusive, such a unit comprising an assembly 167 with a mounting bolt extending in a direction parallel to the length of the gap. As will appear from a study of FIGS. 2, 3, and 4, a transducer such as 18 or 19 comprises a head assembly 167 having affixed thereto a short cylindrical boss 169 and a bolt 170 coaxial therewith and extending beyond the boss, the assembly being seated in a two part shell or enclosure comprising a base 171 and a cap 172. A short cylindric bore 173 in the base communicating with a coaxial aperture 174 of reduced diameter receive the head assembly boss 169 as a snug fit in bore 173 while the bolt 170 extends through the aperture 174. Spring washer 175 and nut 176 threaded on the end of the bolt serve to retain the head assembly in the mounting. Nut 176 is freely received in a suitable registering hole 192 formed in plate 66.

The head assembly includes a cylindrically arcuate face portion wherein a gap (not shown) is seated or embedded to lie exposed in a retaining body carried by the upper end of bolt 170 and is disposed with the length of the gap at right angles to a tangent to the curvature of the face adjacent the gap. The tape lies in contact with the exposed gap, as shown in FIG. 4 and in section in FIG. 2. It will be observed that the line of contact between the gap and the tape, if extended, would pass substantially through a diameter of ball 177 which is seated in and protrudes from the lower face of the base 171. The enclosure is by design of rigid and unyielding character, for example being milled from aluminum or its alloys. A grub screw 178 is threadedly engaged in a vertical hole formed in the back wall of the base 171, opposite the ball 177, and has a tapering contact point 180 protruding below the base to bear against the face of the panel. The grub screw is locked in place at a desired setting by a second screw 179 threaded into and lying wholly within the same hole as screw 178. The position of head 167 may be rotated with respect to panel 66 about the rest point of ball 177 as center, by extending or reducing the projecting length of screw 178, whereby to orient the gap with respect to the line of contact of the tape. By suitable choice of dimensions and use of a fine pitch thread for the grub screw it is possible to make a highly precise and substantially permanent setting of this parameter, i.e. twist.

Additional adjustment as indicated in FIG. 3 is provided for rotation of the azimuth of the gap to control the alignment of the gap relatively to the direction of advance of the tape. It is well understood that the direction of tape motion and the direction of the length of the gap should be precisely at right angles. A pair of machine screws 181, 182 having heads of somewhat larger diameter than their threaded shanks, are respectively freely passed through vertical bores 189, 190 in body 171 and have their protruding ends threadedly engaged in tapped holes 183, 184 in plate 66. It may be observed by referring to FIG. 4 additionally that a line such as 4—4 drawn between axes of the bores 189, 190 in which the screws are received approximately bisects a line normal thereto passed between the center of ball 177 and the contact point of screw 178. Spring 181' is interposed between the base of the head of screw 181 and its seat in body 171. As screw 182 is manipulated, to advance it downwardly in hole 184, spring 181' exerts a biasing force tending to tension screw 181 and to press the contact areas of screw 178 and ball 177 against the plate 66. It can therefore be readily shown that by suitably advancing or retracting the screw 182, the enclosure may be rocked about an axis in the surface of plate 66 including the contact areas of screw 178 and ball 177 provided that spring 181' is not fully compressed. By the use of this adjusting facility the gap may be aligned in azimuth relatively to the plate positively and easily to an accuracy of a small fraction of a degree of arc.

A further control is provided as illustrated in FIG. 3, for bodily rotating the head assembly 167 into tangency with a lay 10 bridging a gap and to bring the line of contact of the tape with the gap substantially into registry with a diameter extended through ball 177. This is accomplished by additional grub screws 185, 186, disposed in line on opposite sides of body 171 and threadedly engaged in tapped holes, the inwardly protruding ends of the screws pressing against the sides of the head assembly. The direction of pressure applied is along a line offset with respect to the bolt axis, as will be apparent in FIG. 4. The rotation of the assembly 167 in a clockwise direction as viewed from above is achieved by withdrawing screw 186 and turning in screw 185 until the assembly has rotated in its seat in bore 173 to the required position. Similarly, rotation in anticlockwise directon may be effected by reversing the sense of advance of the screws. On completion of the setting both are left in firmly engaging contact with the side walls of the assembly to hold the setting permanently.

In carrying out an adjustment of transducers such as 18 and 19 respective heads such as 167 are introduced into corresponding lower shells or bases 171 and are secured thereon by turning up the respective nuts 176 on spring washers 175. Each enclosure is then placed into position on the plate 66 and the screws 181, 182 are engaged with the tapped holes 183, 184 prepared in the plate 66. Grub screws 185 and 186 in each of the mountings are next initially adjusted to approximately center the assembly in the mounting, and the grub screw 178 is either retracted or advanced as necessary for bringing the entire length of the gap into contact with the tape surface without twisting the tape in its lay between the pulley flanges 16 and 17.

It is essential to align the gap for true transverse contact across the width of the tape, and for optimum adjustment a standard or reference tape which has previously been recorded with the gap set precisely transversely to its length is preferably employed, together with test instruments whose functions will be understood by those skilled in the art. Briefly the test procedure involves reading the recorded standard or reference record with the head under test, and monitoring the output signal for peak output of a high frequency such as 8 kc. per second in the case of tape used with 16 mm. film strip. During the reading the head is rotated or rocked in small angular increments by screw 182 about an axis normal to the face of the tape. Accordingly, such procedure is next indicated in carrying out the azimuth setting of each gap, and an optimum setting determined. The screw 181 is then turned down firmly against spring 181' to lock the setting permanently.

The correct position of the transducer is achieved when a recorded high frequency will replay in either direction of movement of the tape relatively to a reading head, with substantially the same peak output level. This is a critical test which determines whether the three axes of adjustment of the head are correctly aligned, and in addition is a test of the correct positions of the entire transport system including the idlers. The provision for reverse drive of the tape has been found to gain the important advantage of testing the calibration of each instrument.

When the settings are made, the cover shell 172 is placed in registry with the lower shell 171, and is secured thereto by means of cheese-headed screws 187, 188 received in countersunk holes 187', 188', the holes extending through both shells. The length of these screws is chosen so as not to extend to screws 185, 186.

It will be evident from the foregoing description that the precise and permanent adjustment of a transducer in relation to a lay of tape guided by flanged discs may be carried out by the means described, where the transport system including the discs is in predetermined relation with a mounting plate. It has been established as a fact that once the settings have been made, no further adjustment is required even after long intervals, as borne out by extensive use of actual embodiments, which use has extended upwards of one thousand hours per unit under widely varying environments, with no observable alteration in the settings. The importance of this feature of the system may be the better understood when it is considered that the audio signal involved was highest quality motion picture studio sound.

By virtue of the use of a primary standard of the best obtainable precision of azimuth setting when initially setting the heads of all sound units, it is assured that a tape record made on any one may be played back on any other unit without risk of deterioration of signal quality as would arise where gap settings have not been referred to a common standard.

I claim:

1. An adjustable support structure for orienting the air gap in a magnetic circuit of a transducer with respect to a planar mounting member, comprising a case having at least a bottom wall, first adjustment means for supporting the transducer to be rotatable in the case about an axis normal to said bottom wall and parallel with said gap, a ball contact protruding exteriorly of the case from said wall having a diameter aligned with said gap and adapted to bear against said member, second adjustment means in said case adjustably extendable from said bottom wall and spaced from said axis opposite said ball, third adjustment means comprising a pair of screw-threaded bolts parallel with said axis extending from said wall and adapted to threadedly engage in respective spaced registering holes in said member, said bolts being slidable in respective bores in said case and having heads larger than said bores, spring bias means seated in the case and engaging the head of one of said bolts and tending to retract said bolt into the case, said bolts being spaced on opposite sides of said first axis and in a line therewith at right angles to a line between said ball and said second adjustment means.

2. A structure as in claim 1 wherein the first adjustment means comprise a pair of opposed screws threadedly engaged in the case for screw advancement and retraction at right angles to said axis and adapted to grip said transducer between their inner ends.

3. A structure as in claim 1 wherein said second adjustment means comprise a screw threadedly engaged in a threaded bore in the case, and a frictional screw locking means adapted to engage said screw.

4. In a mounting for adjustably supporting a transducer with respect to a plate and wherein said transducer has a magnetic circuit including a line gap retained in a body which is fixed to a cylindrical boss having a coaxial bolt of lesser diameter than the boss extending therefrom with the bolt axis offset from said gap and disposed parallel with the length of said gap, a housing having a base, a cylindrical stepped bore formed in the base adapted to seat said boss therein for rotation about said bolt axis, a projection extending from said base on a side remote from said gap adapted to bear against said plate, first adjusting means supported in the housing and projecting parallelly therefrom with said bolt axis to a side of said base remote from said gap and adapted to bear against said plate, said means being adjustable in projecting length and disposed in a first plane including the projection and the said axis, and a pair of second means supported in the housing and projecting parallelly therefrom with the said axis and adapted to engage threaded holes in said plate disposed in a second plane including said axis and at right angles to the first plane, and resilient means associated with one of said pair of second means adapted to retract said one of said means into the housing.

5. A mounting as in claim 4 wherein said housing includes means adjustably rotating said transducer in said stepped bore about said axis.

6. A mount for adjustably orienting a transducer with respect to a planar support member, said transducer having an integral cylindric boss and a coaxial threaded shaft having its axis parallel with and offset from a linear air gap in a magnetic circuit in said transducer, comprising a rigid box-like structure having at least a pair of side walls and a bottom wall, an aperture in said bottom wall having a stepped diameter bore adapted to rotatably seat said boss therein, a nut threadedly carried on said shaft for securing said transducer in said mount, a pair of tapped holes in said side walls having their axes aligned transverse to and offset from said boss axis to intersect said transducer, a pair of screws threadedly engaged in said holes for adjustably clamping said transducer in predetermined angular relation with said mount, a pair of cylindric bores formed in said side walls having axes parallel with said boss axis and spaced apart along a line parallel with said screw axes, resilient tensioning means detachably attached in said cylindric bores for connecting said mount in spaced relation with said planar member, a tapped bore in said bottom wall having its axis parallel with said boss axis and spaced therefrom on a side remote from said gap, a set screw threaded in said tapped bore to adjustably project from said bottom wall, and a fixed projecting element extending to the same side of said wall as said set screw having a spherical contact area in line with said gap.

7. A mount as in claim 6 wherein said resilient means comprise headed bolt means having threaded shanks received in said cylindric bores and extending therethrough to protrude beyond said bottom wall, said shanks being adapted to be adjustably secured in registering threaded bores formed in said planar member, and compression spring means interposed between a head of one of said bolt means and said mount.

References Cited in the file of this patent

UNITED STATES PATENTS

| | | |
|---|---|---|
| 2,530,584 | Pontius | Nov. 21, 1950 |
| 2,644,856 | Pettus | July 7, 1953 |
| 2,678,971 | Barany | May 18, 1954 |
| 2,721,743 | Erikson et al. | Oct. 25, 1955 |
| 2,864,892 | Perkins | Dec. 16, 1958 |

FOREIGN PATENTS

| | | |
|---|---|---|
| 676,810 | Germany | June 12, 1939 |
| 828,014 | Germany | Jan. 14, 1952 |